(12) United States Patent
Banton (10) Patent No.: US 6,198,850 B1
(45) Date of Patent: Mar. 6, 2001

(54) SYSTEM AND METHOD FOR SEGMENTATION DEPENDENT LOSSY AND LOSSLESS COMPRESSION FOR HIGHER QUALITY

(75) Inventor: Martin E. Banton, Fairport, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/096,190

(22) Filed: Jun. 12, 1998

(51) Int. Cl.[7] ............................. G06K 9/36; G06K 9/34; H04N 1/417
(52) U.S. Cl. .................... 382/239; 382/234; 382/173; 358/430
(58) Field of Search ........................... 382/232, 239, 382/244, 248, 234, 180, 176, 173; 358/430, 450, 462, 453, 467; 395/114, 112

(56) References Cited

U.S. PATENT DOCUMENTS

| | | | |
|---|---|---|---|
| 5,414,527 | 5/1995 | Koshi et al. | 358/433 |
| 5,455,680 | 10/1995 | Shin | 358/426 |
| 5,552,898 | 9/1996 | Deschuytere | 358/426 |
| 5,586,200 | 12/1996 | Devaney et al. | 382/232 |
| 5,619,594 | 4/1997 | Melen | 382/233 |
| 5,659,635 | 8/1997 | Komatsu et al. | 382/245 |
| 5,982,937 | * 11/1999 | Accad | 382/239 |
| 5,999,710 | * 12/1999 | Smith et al. | 395/114 |

* cited by examiner

Primary Examiner—Thomas D. Lee
Assistant Examiner—Wenpeng Chen
(74) Attorney, Agent, or Firm—Oliff & Berridge, PLC (57) ABSTRACT

A method and system takes advantage of both lossy and lossless compression techniques to increase processing speed and efficiency, and to decrease required image storage space. In the system and method, the input image data is divided into pixel blocks. Segmentation tags are used to determine if pixel block contains sharply defined images, such as text or low frequency halftone. If the answer is "no," i.e., a selected or predetermined number of the pixels are not classified as text or low frequency halftone, or the pixels classified as text or low frequency halftone occur only in selected or predetermined areas of the block, then lossy compression is performed on the pixel block. An artificial block is generated and losslessly compressed. The artificial block includes pixels having values that will be losslessly compressed by a large compression ratio. If the answer is "yes," i.e., there are at least the selected or predetermined number of pixels in the pixel block that should be processed as text or low frequency halftone, and/or the pixels classified as text or low frequency halftone do not occur in the selected or predetermined areas of the pixel block, then that block is sent to a buffer to be losslessly compressed. An artificial block is generated and lossy compressed. The artificial block includes pixels having values that will be lossy compressed by a large compression ratio.

24 Claims, 5 Drawing Sheets

SYSTEM AND METHOD FOR SEGMENTATION DEPENDENT LOSSY AND LOSSLESS COMPRESSION FOR HIGHER QUALITY

BACKGROUND OF THE INVENTION

1. Field of Invention

This invention relates to image segmentation and compression. In particular, the invention is directed to using segmentation information to enable compression and decompression of image data by both lossless and lossy techniques.

2. Description of Related Art

JPEG (Joint Photographic Experts Group) is recognized as a good technique for compressing contones and filtered high frequency halftones. This lossy compression technique is especially effective in compressing color images. Compressing images in a luminance/chrominance space and using the fact that the human visual system does not need the same resolution for color information as it does for intensity results in high compression ratios.

However, lossy techniques are not well suited for compressing and decompressing text images. The linear transforms used in lossy techniques have difficulty compressing sharp edges. Consequently, these edges tend to blur and soften through multiple compression and decompression operations.

Lossless compression techniques, such as Lempel Ziv (LZ), are better suited for compressing text and low frequency halftone images. These lossless compression techniques provide high compression ratios and compression processing speeds, and are also advantageous for image data that contains significant amounts of repeated data. However, lossless compression techniques are not as efficient when compressing a high frequency halftone, contone or background image where high resolution is not required.

SUMMARY OF THE INVENTION

This invention provides a method and system to take advantage of both lossy and lossless compression techniques in order to increase processing speed and efficiency, and to decrease required image storage space.

In the system and method according to this invention, the input image data is divided into pixel blocks. Segmentation tags are used to determine if a pixel block contains sharply defined images, such as text or low frequency halftone. If the answer is "no," i.e., a selected or predetermined number of the pixels are not classified as text or low frequency halftone, or the pixels classified as text or low frequency halftone occur only in selected or predetermined areas of the block, e.g., an isolated pixel is determined to be text but all of the other pixels in the block are determined as contone, then lossy compression is performed on the pixel block. An artificial pixel block is generated and put into a buffer to be losslessly compressed. The artificial block includes pixels of constant value. This creates areas in the file to be losslessly compressed that will compress by a large ratio.

If the answer is "yes," i.e., there are at least the selected or predetermined number of pixels in the pixel block that should be processed as text or low frequency halftone, and/or the pixels classified as text or low frequency halftone do not occur only in selected or predetermined areas of the pixel block, then that block is sent to a buffer to be losslessly compressed. An artificial pixel block is generated that includes pixels of the same value. The artificial block is put into a buffer to be compressed using a lossy technique. This creates areas in the file to be compressed with lossy techniques that will compress by a large ratio.

In one preferred embodiment, JPEG is used as the lossy compression technique, while Lempel Ziv (LZ) is used as the lossless compression technique. In JPEG, 8 pixel×8 pixel blocks of the image are compressed. In the method and system of this invention, if the current block is compressed using the lossy JPEG technique, a single block of 8 pixels in 8 scanlines are compressed. In contrast, if the current block is compressed using the lossless LZ technique, each of the 8 scanlines are compressed separately in the compressed block.

Thus, when the current block is JPEG compressed, in the artificial block to be LZ compressed, the value stored for each line is chosen to match the value of the last pixel in that corresponding scanline in the preceding losslessly compressed 8×8 block. In contrast, when the current block is LZ compressed, in the artificial block to be JPEG compressed, the value is chosen to be the average of the 64 pixels in the last block that was JPEG compressed. Because JPEG decodes the direct current (DC) value of a block as a difference from the previous JPEG-compressed block's DC value and because with all pixels in the 8×8 block having the same value there will be no frequency components beyond the DC component, this procedure will create areas in the buffer file to be JPEG compressed that will compress by a large ratio.

These and other features and advantages of this invention are described in or are apparent from the following detailed description of the preferred embodiment.

BRIEF DESCRIPTION OF THE DRAWINGS

The invention is described in detail with reference to the following drawings, wherein like numerals represent like elements and wherein.

DETAILED DESCRIPTION OF PREFERRED EMBODIMENTS

Figure 1:
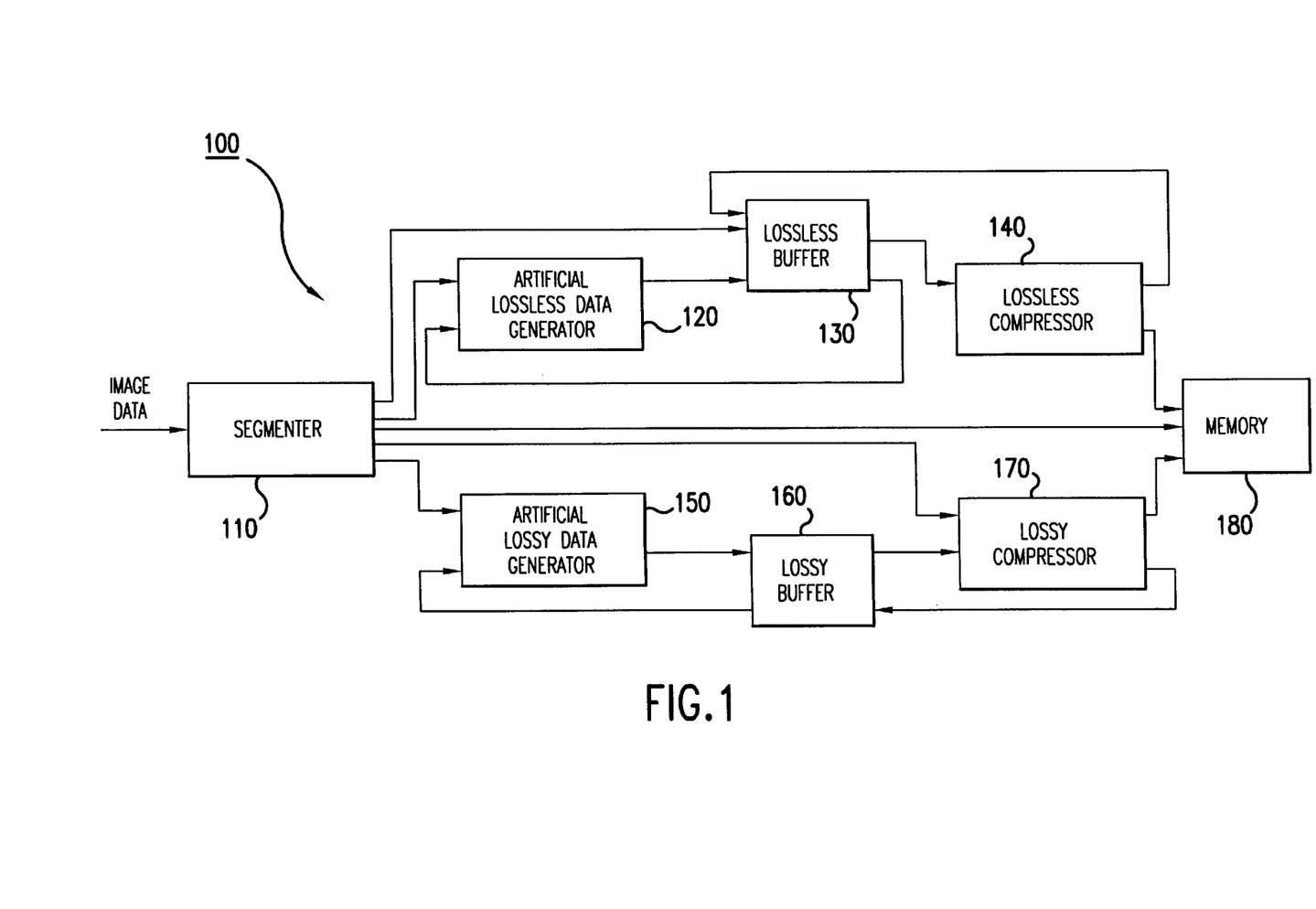
FIG. 1 is a block diagram of a segmentation and compression portion of an image data processing system according to this invention.

FIG. 1 is a block diagram showing the basic components of an exemplary image data compression system 100 according to this invention. Image data is input into a segmenter 110 that segments text portions and low frequency halftone portions of the image data, for example, from contone portions, high frequency halftone portions and/or background image portions of the image data. It should be appreciated that the image data can be still-image data or video image data or any other type or combination of known image data or later-developed image data. That is, the type of the image data is not relevant to the system and method of this invention, so long as the image data can be segmented into portions that are more effectively compressed using a lossless compression technique and portions that are more effectively compressed using a lossy compression technique. According to this invention, "effectively" can refer to the quality of the decompressed image, the depth of the compression of the portions, or any other known or later developed quality of compression techniques, or any combination of these qualities.

The segmenter 110 segments the image data using any known method, such as those methods described in U.S. patent applications Ser. No. 08/488,002, filed Jun. 7, 1995 (now U.S. Pat. No. 5,802,203), and Ser. No. 08/686,803, filed Jul. 26, 1996 (now U.S. Pat. No. 5,850,474), each incorporated herein by reference in its entirety, or any later developed segmentation technique, or any combination of segmentation techniques. That is, the segmentation technique, or techniques, is not relevant to the system and method of this invention, so long as the segmentation technique, or techniques, segments the image data into portions that are more effectively compressed using the lossless compression technique and into portions that are more effectively compressed using the lossy compression technique, as described above.

The segmenter 110 examines one block of image data at a time to determine if text or low frequency halftone image data is present in the block. In the exemplary image data compression system 100, the segmenter 110 segments text and low frequency halftone portions of the data image from contone, high frequency halftone, and background portions of the image data. However, as described above, the image data may be segmented in other ways so that portions requiring lossless compression, such as sharp lines or other important features which require the total image to be preserved, are distinguished from portions that do not require lossless compression.

If the segmenter 110 determines that current block of image data is to be losslessly compressed, the current image data block is input to a lossless buffer 130. The lossless buffer 130 temporarily holds blocks of image data until the image data is ready to be sent to a lossless compressor 140 for compression. The lossless compressor 140 compresses data losslessly using any known or later developed lossless compression technique, including Lempel Ziv (LZ). Other lossless compression techniques include CCITT group 4 and JBIG (Joint Binary Imaging Group). The lossless compressor 140 then sends the losslessly compressed data to the memory 180, where it is stored in a lossless portion of a compressed image data file for the compressed image.

Alternatively, if the segmenter 110 determines that the current block of image data is to be lossy compressed, the current image block is input to a lossy buffer 160. The lossy buffer 160 temporarily holds blocks of image data until the image data is ready to be sent to a lossy compressor 170. The lossy compressor 170 compresses the block using any known lossy or later developed compression technique, such as JPEG, etc., and sends the compressed data to the memory 180, where it is stored in a lossy portion of the compressed image. In addition, at least one piece of information, for example, the DC value (average value) of the pixels in the block that describes the data to be sent to the lossy compressor is saved for later use in generating artificial data. It should be appreciated that the compressed image data file may optionally include a segmentation tag portion that includes the segmentation tags used or generated by the segmenter 110 to segment the image data. In this case, the segmenter 110 outputs these segmentation tags directly to the memory 180.

In addition, when the current block is to be losslessly compressed, the segmenter 110 sends a signal to the artificial lossy data generator 150. The artificial lossy data generator 150 retrieves at least one value for the last block of actual image data that was lossy compressed. The artificial lossy data generator 150 then creates an artificial block of image data using this at least one value. This will be highly compressed using the particular lossy compression technique implemented in the lossy compressor 170. The artificial lossy data generator 150 sends this artificial block to the lossy buffer 160.

Similarly, when the current block is to be lossy compressed, the segmenter 110 sends a signal to the artificial lossless data generator 120. The artificial lossless data generator 120 retrieves at least one value for the last block of actual image data that was losslessly compressed. The artificial lossless data generator 120 then creates an artificial block of image data using this at least one value. This artificial block of image data will be highly compressed using the particular lossless compression technique implemented in the lossless compressor 140.

Handling of the first block in a sequence, such as the first block of image data for an image, is unique in that there are no values for previous block of actual image data to refer to. In this special case, synthetic values are used, for example. An obvious choice is to put all zeros in the artificial files until real image information is available. The lossy and lossless artificial data generators 120 and 150 may, for example, begin each new sequence of blocks by including at least one arbitrary value for the first block and not refer to the at least one value for the previous sequence of blocks.

The segmenter analyzes blocks of data to determine if edges representative of text and graphics and of low frequency halftones are present. Making the determination of the presence of low frequency halftones may involve looking at data in surrounding blocks. If the presence of text and/or graphics or low frequency halftones is detected, the data is tagged to be sent to the lossless compressor. If the presence of text and/or graphics or low frequency halftone is not detected, the data is tagged to be sent to the lossy compressor. To accommodate the events where not every pixel in the block is either text and/or graphics or low frequency halftone, rules may be used to determine which compressor to use (i.e., lossy or lossless), based on the numbers of pixels labeled as either text and/or graphics or low frequency halftone and/or on the positions of the different classes of pixels.

Figure 2:
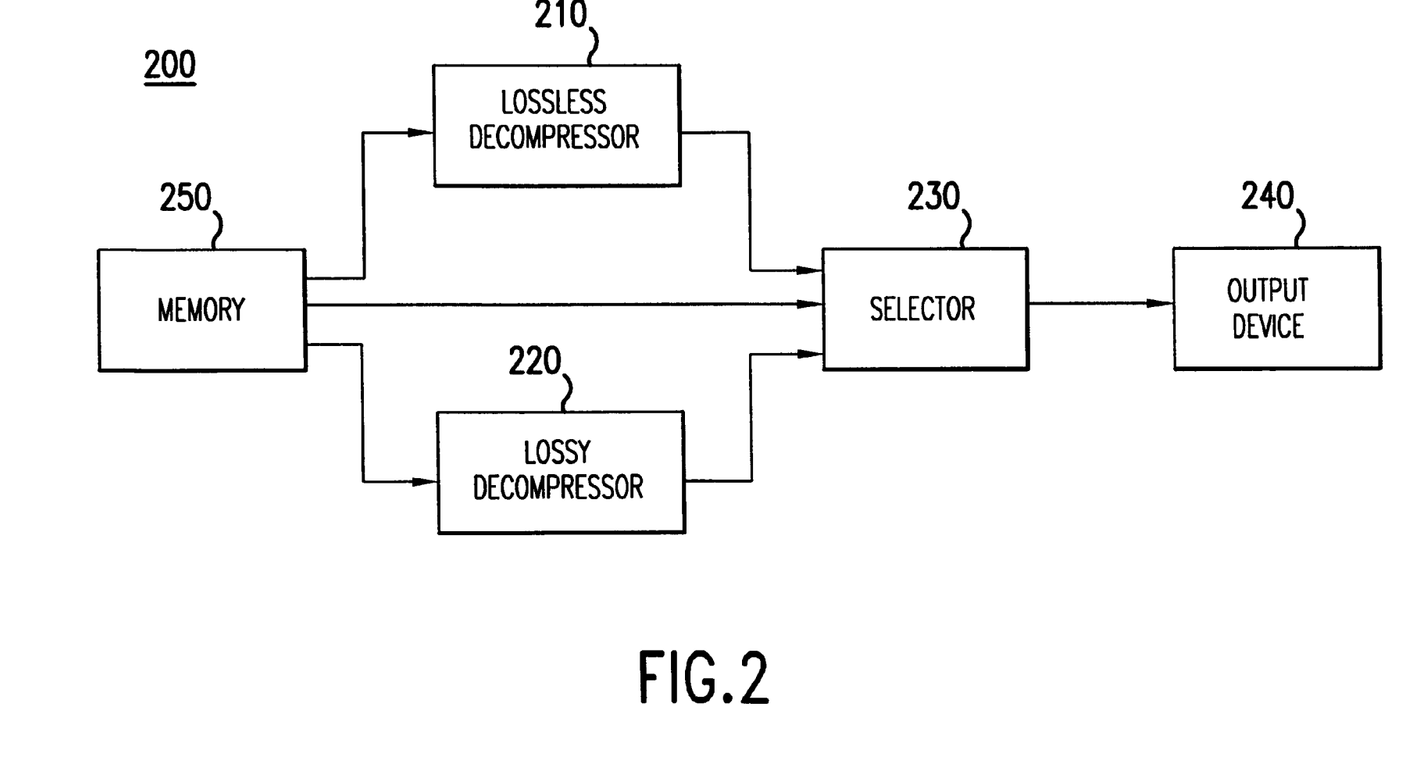
FIG. 2 is a block diagram of a decompression section of an image data processing system according to this invention.

In order for the image data to be output to an image output device, such as a printer, the lossy and lossless compressed data stored in the compression image data file must be decompressed. As shown in FIG. 2, the lossless decompressor 210 retrieves the lossless portion of the compressed image data filed from a memory 250. The lossy decompressor 220 retrieves the lossy portion of the compressed image data file from the memory 250. The lossless decompressor 210 and the lossy decompressor 220 decompress the lossy and lossless portions of the image data using these lossless and lossy decompression techniques, respectively, that correspond to the lossless and lossy compression techniques used to create the lossless and lossy portions.

A selector 230 receives both the decompressed lossy and lossless image data from the lossy and lossless decompressor and determines for each block, whether to use the lossy image data or the lossless image data.

Optionally, the selector 230 can also input the segmentation tag portion of the compressed image data file, if one is present in the compressed image data file.

If the selector 230 has the segmentation tag information available to it, the selector merely uses this segmentation tag information to determine, for each image data block, whether the corresponding decompressed lossy image data block or the corresponding decompressed lossless image data block is the actual image data block. Based on this rather trivial determination, the selector 230 outputs the decompressed lossy or lossless image data block as the actual image data block to an output device 240. The output device can be a display device, a printer, or the like.

However, if the segmentation tag information is not available to the selector 230, the selector 230 must analyze, for each image data block, the corresponding decompressed lossy and lossless image data blocks to determine which one is the actual image data block and which one is the artificial data block. The selector 230 makes this determination based on the types of artificial data blocks generated for the lossy and lossless compression techniques used to generate the lossy and lossless compressed image data portions. In general, the lossy and lossless artificial data blocks will have recognizable structures that generally would not normally occur in an actual image data block compressed using the lossy or lossless compression techniques, respectively. As above, based on this determination, the selector outputs the decompressed lossy or lossless image data block as the actual image data block to the output device 240.

By generating two separate streams of image data, one losslessly compressed and the other lossy compressed, the processing speed is increased and the required storage space for the entire compressed image data file is decreased. Thus, this procedure will create areas, i.e., in the artificial data blocks, in the file compressed by a large ratio.

Furthermore, the particular segmentation scheme should be selected to maximize the overall compression ratios of the actual and artificial data blocks for the selected lossy and lossless compression techniques.

While the invention may be used with any lossy and lossless compression technique, FIGS. 1 and 2 will be described using JPEG (lossy) and LZ (lossless) methods for exemplary purposes. If the segmenter 110 determines that the first block of image data is text or low frequency halftone, for example, the image data block is input to the lossless buffer 130. The lossless buffer 130 temporarily holds blocks of image data until the image data is ready to be sent to the lossless compressor 140 for compression. The lossless compressor 140 compresses the block using an LZ compression technique and sends the compressed data to the memory 180 for storage.

When text or low frequency halftone pixels are detected in the block, the segmenter 110 also sends a signal to the artificial lossy data generator 150. The artificial lossy data generator 150 retrieves the average direct current (DC) value for the previous lossy compressed block of image data. The artificial lossy data generator 150 then creates an artificial block of image data which has the same DC value as the last block that was lossy compressed. The artificial lossy data generator 150 sends this artificial block to lossy compressor 170. The lossy compressor 170 compresses the block using a JPEG compression technique and sends the compressed data to memory 180 for storage.

Alternatively, if the segmenter 110 classifies the video data as contone, high frequency halftone or background image data, the segmenter 110 sends the block directly to the lossy buffer 160. The lossy buffer 160 temporarily holds blocks of image data until the image data is ready to be sent to the lossy compressor 170. The lossy compressor 170 compresses the image data using a JPEG compression technique and then sends the compressed data block to the memory 180 for storage. The lossy compressor 170 also determines the average DC value for the compressed data block and sends that value to lossy buffer 160 for storage. This DC value is overwritten for each data block compressed by the lossy compressor 170.

As with the lossless data block, the segmenter 110 sends a signal to the artificial lossless data generator 120 to create an artificial data block consisting of scanlines of pixels of constant value. The value stored for each line is chosen to match the value of the last pixel in the corresponding scanline in the preceding block. This creates areas in the file to be losslessly compressed that will compress by a large ratio. The artificial lossless data generator 120 creates the artificial data block and sends the block to lossless buffer 130 to wait until all of the scanlines are processed.

As shown in FIG. 2, the lossless decompressor 210 retrieves the LZ compressed data from memory 180. The lossy decompressor 220 retrieves the JPEG compressed data from memory 180 for lossy decompression.

The selector 230 receives both the lossy and lossless decompressed data and determines which data to use. For example, if the data from the lossy stream is not a constant value, then the selector 230 determines that lossy compression must have been used to compress that block of data. If the data from the lossy stream is a constant value but a different constant value then the DC value of the previous lossy block, then the selector 230 determines that lossy compression must have been used to compress the block of data. Alternatively, if the data from the lossy stream is a constant value and that constant value is the same as the DC value of the previous lossy block, then the selector 230 determines that the data from the lossless data stream must represent the data to be used. This technique covers the situation where the real data has a large area of constant value. In this case, the lossy and lossless streams would have the same data so it would be safe to use the lossless technique. Once the selector 230 determines the correct data to use, the data is output to an image output device.

Figure 3:
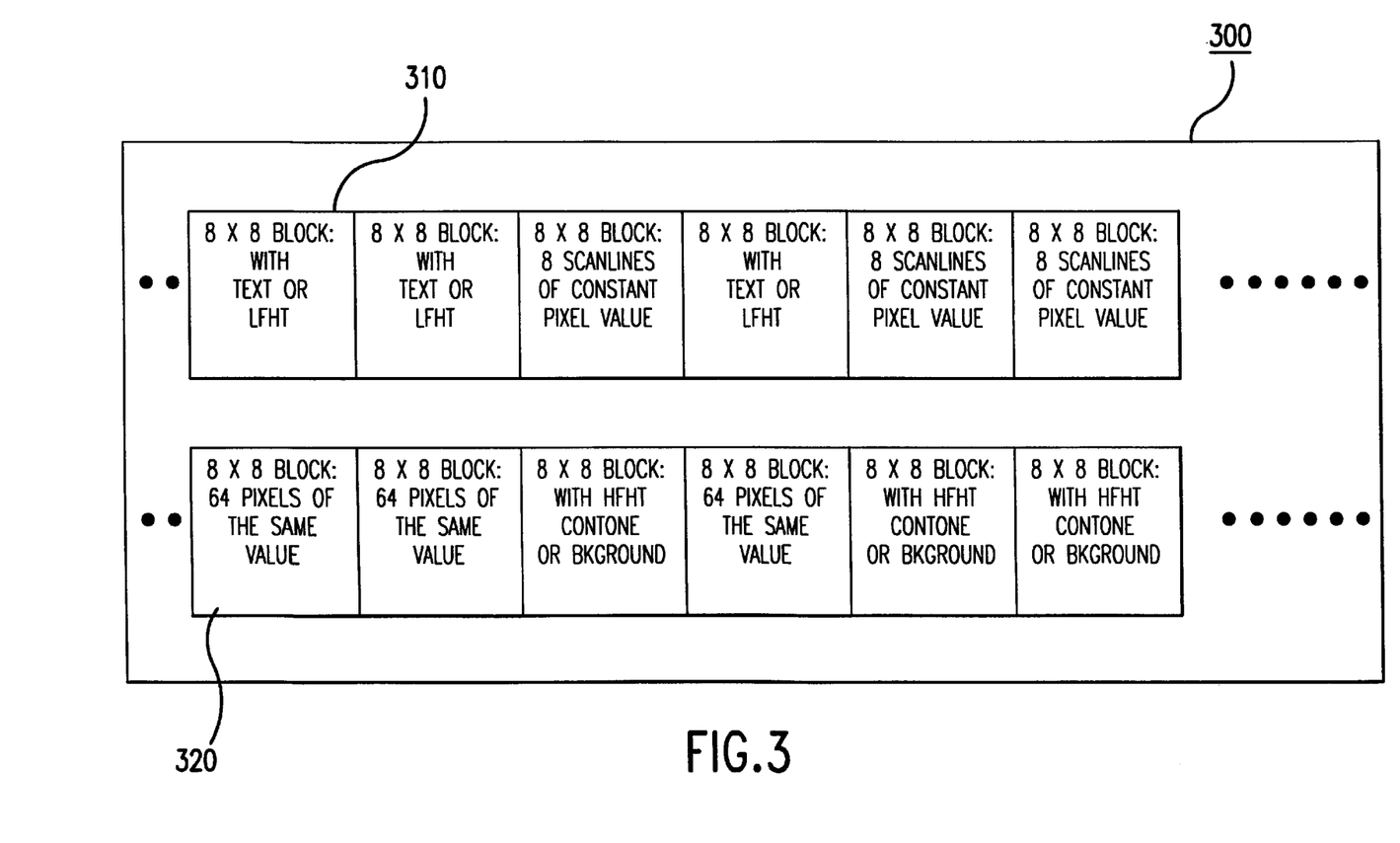
FIG. 3 is a diagram of exemplary lossy and lossless data files.

FIG. 3 illustrates this compression and storage technique of the two separate streams of image data for JPEG and LZ compression, as described above. In particular, FIG. 3 shows a compressed image data file 300, and portions of the losslessly compressed portion 310, and the lossy compressed portion 320. A segmentation tag information portion may also be used but is not shown. The top portion 310 of FIG. 3 shows the 8×8 blocks with text or low frequency halftone image data forming the losslessly compressed data portion. The middle portion 320 of FIG. 3 shows the 8×8 blocks with contone, high frequency halftone, or background data forming the lossy compressed portion 320. Accordingly, in the lossless compressed portion 310 for every block that is losslessly compressed using LZ compression, a corresponding block artificial data; which has been artificially created and compressed by the JPEG lossy technique, occurs in the lossy compressed data portion 320 similarly in the lossy compressed data portion 320, for every block that is lossy compressed using JPEG compression, a corresponding artificial data block, which has been artificially created and compressed by the LZ lossless technique occurs in the lossless compressed data portion 310.

By generating two separate streams of image data, one losslessly compressed and the other lossy compressed, the processing speed is increased and the required storage space for the entire compressed image data file is decreased. Lossy techniques code the DC value of a block as a difference from the previous block's DC value. Thus, this procedure will create areas in the file to be lossy compressed that will be compressed by a large ratio since blocks of the same DC value have no difference value to be coded and the coefficients for all AC values are all zero. Furthermore, the value stored for each line of lossless image data is chosen to match the value of the last pixel on the corresponding scanlines in the preceding block. This technique also creates areas in the file to be lossly compressed that will be compressed by a large ratio.

Figure 4:
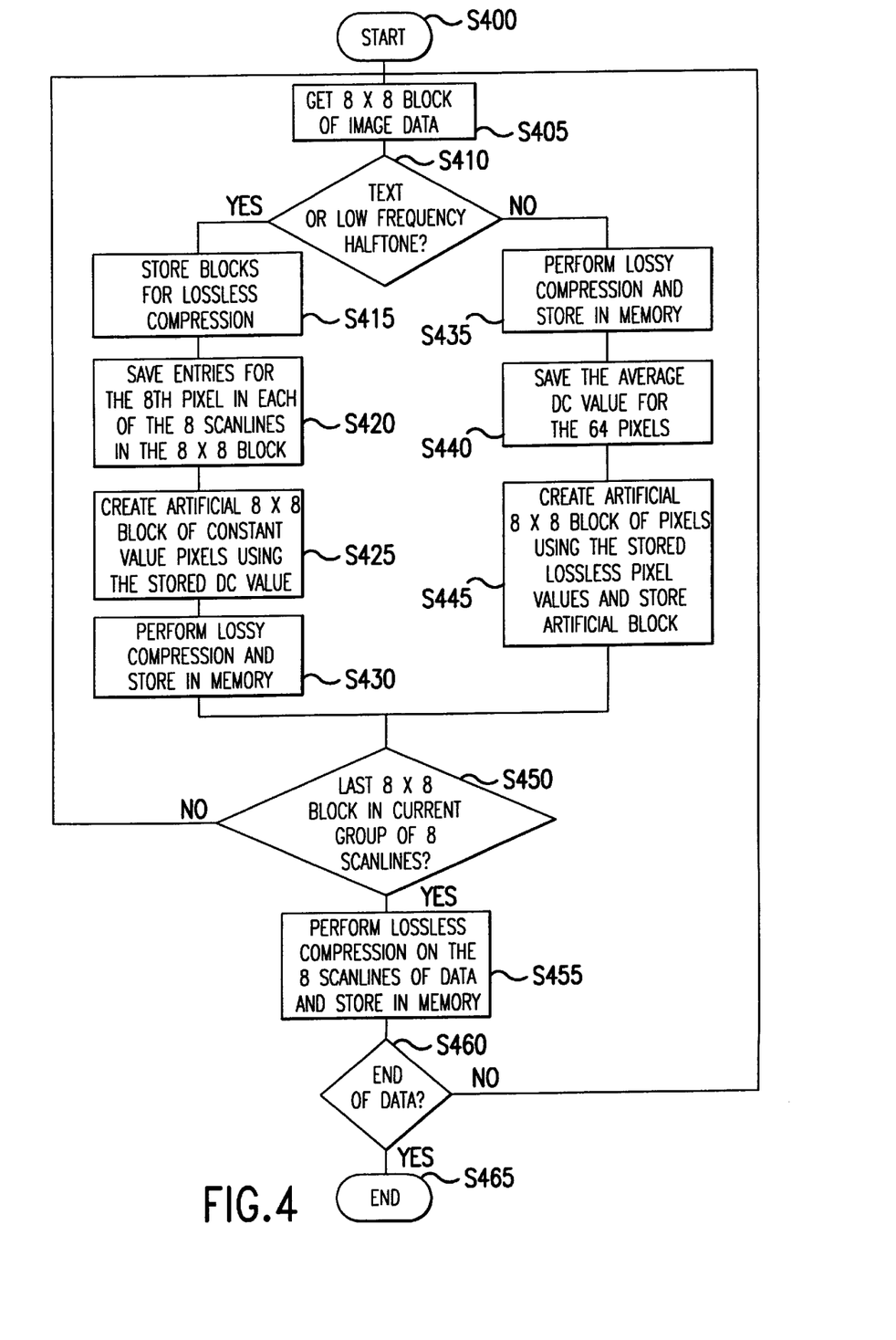
FIG. 4 is a flowchart outlining one method for lossy and losslessly compressing image data according to this invention.

FIG. 4 is a flowchart outlining one embodiment of the segmentation and compression process according to this invention. As discussed above, while this invention may be used for any combination of any lossy and any lossless compression technique, the method shown in FIG. 4 uses JPEG as the lossy compression technique and LZ as the lossless compression technique, merely for ease of discussion. Similarly, while this invention can be used with any segmentation scheme, the method shown in FIG. 4 segments text or low frequency halftone portion for lossless compression and all other portions for lossy compression.

Beginning at step S400, control continues to step S405, where an 8×8 block of image data is input. In step S410, the current block of image data is analyzed to determine if it is text or low frequency halftone. If text or low frequency halftone pixels are detected in the current block of image data, control continues to step S415. Otherwise, control slips to step S435.

In step S415, the current 8×8 block of pixels is marked or stored for lossless compression. Next, in step S420, the entries for the eighth pixel in each of the eight scanlines in the 8×8 block are saved for use in creating a subsequent artificial lossless data block. Then, in step S425, an artificial 8×8 block of constant value pixel is generated using a saved DC value. In step S430, lossy compression is performed on this block and the lossy compressed image data block is stored in the lossy portion of the compressed image data file. Control then slips to step S450.

Alternatively, in step S435, when text or low frequency halftone pixels are not detected in the current data block, the current 8×8 block is lossy compressed and stored in the lossy portion of the compressed image data file. Then, in step S440, the average DC value for the 64 pixels in the 8×8 block are stored. Next, in step S445, an artificial 8×8 block of pixels is generated using the saved entries from a previous losslessly compressed actual image data block. Control then continues to step S450.

In step S450, the previous block is examined to determine if it is the last 8×8 block in the current group of eight scanlines. If the previous 8×8 block was not the last 8×8 block in the current group of eight scanlines, control jumps back to step S405. Otherwise, control continues to step S455.

In step S455, the stored eight scanlines of data are losslessly compressed and the losslessly compressed image data for these eight scanlines is stored in the lossless portion of the compressed image data file.

In step S460, the image data is analyzed to determine whether any more data needs to be compressed. If more data needs to be compressed, control returns to step S405. Otherwise, if no more data needs to be compressed, control continues to step S465 where the compression process ends.

Figure 5:
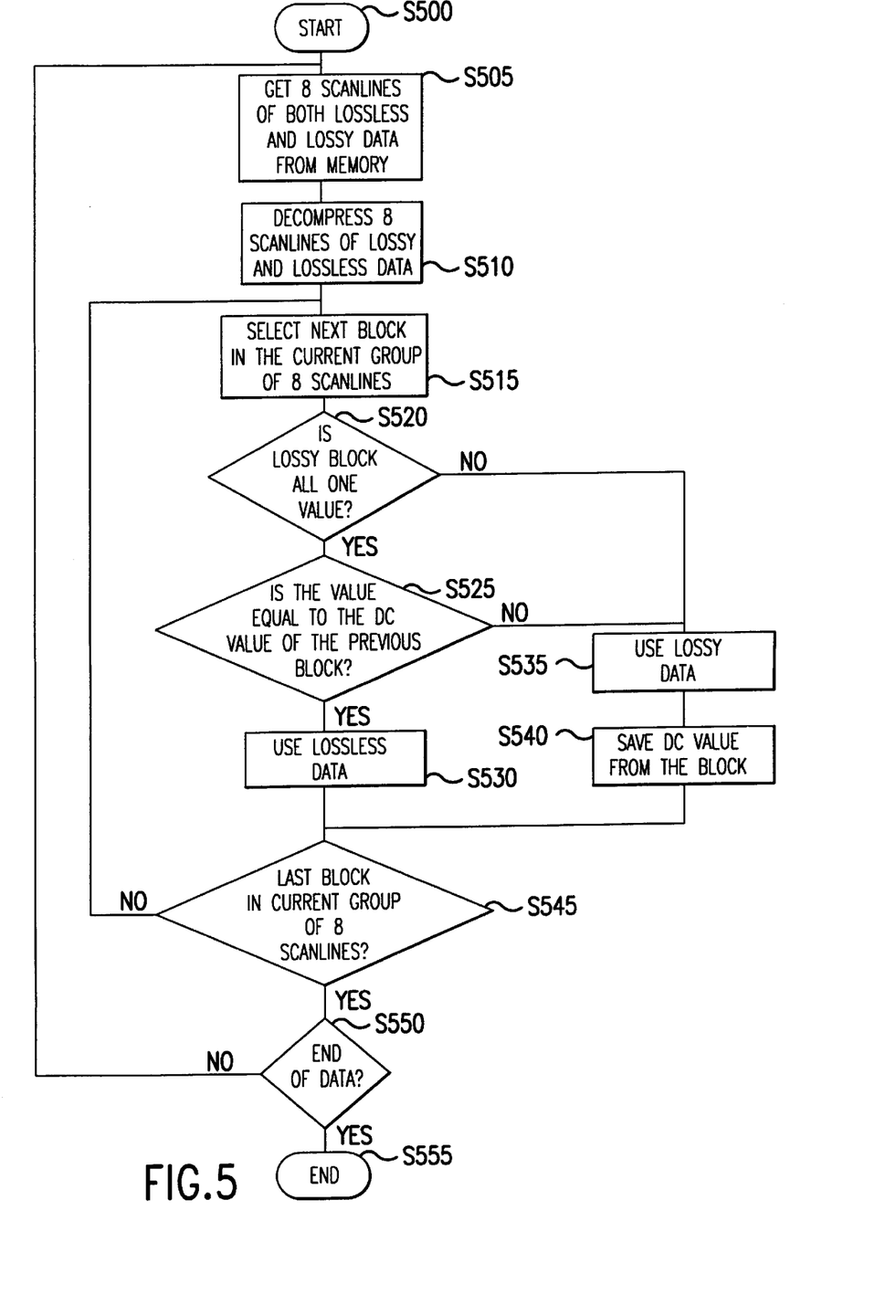
FIG. 5 is a flowchart outlining one method for decompressing losslessly and lossy compressed image data according to this invention.

FIG. 5 is a flowchart outlining one preferred decompression process according to this invention. As discussed above, while this invention may be used with any combination of any lossy and any lossless compression technique, the lossy and lossless decompression techniques must correspond to the selected lossy and lossless compression techniques. Thus, the decompression method shown in FIG. 5 uses inverse JPEG as the lossly decompression techniques and inverse LZ as the lossless decompression technique. The decompression method shown in FIG. 5 also assumes that the segmentation tag information is not available. Beginning at step S500, control continues to step S505, where the next eight scanlines of data from each of the lossy and lossless portions of the compressed image data file are input as the current compressed data. In step S510, the eight scanlines of lossy and lossless data are respectively lossy and losslessly decompressed. Next, in step S515, the next 8×8 lossy and lossless block of the current eight scanlines are selected as the current blocks of decompressed lossy and lossless image data. Then, in step S520, the decompressed lossy image data is analyzed to determine whether the current block of decompressed lossy image data is all one value. If the lossy image data is all one value, control continues goes to step S525. Otherwise, control jumps to step S535.

In step S525, the DC value of the current block is equal to the DC value of the previous block of decompressed lossy image data. If the current block of decompressed lossy image data has the same DC value as the previous block of decompressed lossy image data, control continues to step S530. Otherwise, control jumps to step S535. In step S530, the current block of decompressed lossless image data is selected as the current block of actual image data. Control then jumps to step S545. In contrast, in step S535, the current block of decompressed lossy image data is selected as the current block of actual image data. Then, in step S540, the DC value of the current block of decompressed lossy image data is saved for use in the next elevation of step S525. Control then continues to step S545.

In step S545, the decompressed image data is analyzed to determine whether the last block in the current group of eight scanlines has been analyzed. If the last 8×8 block in the current group of eight scanlines has not been analyzed, control jumps back to step S515, where the next 8×8 lossy and lossless blocks are selected as the current blocks of decompressed lossy and lossless image data. Otherwise, control continues to step S550, where the compressed image data file is analyzed to determine whether the end of the compressed image data file has been reached. If the end of the compressed image data file has not been reached, control jumps back to step S505, to input the next eight scanlines of compressed lossless and lossy image data. Otherwise, control goes to step S555, where the decompression method ends.

As shown in FIGS. 1 and 2, segmentation-dependent compressor 100 and the segmentation-dependent decompressor 200 are preferably implemented on a programmed general purpose computer. However, the segmentation-dependent compressor 100 and/or the segmentation-dependent decompression 200 can also be implemented on a special purpose computer, a programmed microprocessor or microcontroller and peripheral integrated circuit elements, an ASIC or other integrated circuit, a hard wired electronic or logic circuit, such as a discrete element circuit, a programmable logic device, such as a PLD, PLA, FGPA or PAL, or the like. In general, any device on which a finite state machine, that is in turn capable of implementing the flowcharts shown in FIGS. 4 and 5, can be used to implement the segmentation-dependent compressor 100 and/or the segmentation-dependent decompressor 200.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. An image data processing system, comprising:
   a segmenter that receives image data and segments the image data into lossy and lossless data;
   a first storage device that temporarily stores the segmented lossless data;
   an artificial lossless data generator that generates artificial lossless data based on a value stored in the first storage device;
   an artificial lossy data generator that generates artificial lossy data based on a value stored in a second storage device;
   a lossless compressor that compresses the lossless data stored in the first storage device and the artificial lossless data generated by the artificial data generator;
   a lossy compressor that compresses the lossy data segmented by the segmenter and the artificial lossy data generated by the artificial lossy data generator; and
   a third storage device that stores the compressed lossy and lossless data,
   wherein the artificial lossless data generator generates artificial lossless data based on a value of a last pixel in each scanline in a previously compressed lossless data block.

2. The image data processing system of claim 1, wherein the artificial lossy data generator generates artificial lossy data based on an average value of pixels in a previously compressed lossy data block.

3. The image data processing system of claim 1, wherein the segmenter segments Z×Z blocks of image data, where Z is an integer greater than 1.

4. The image data processing system of claim 1, wherein the lossy and lossless data is stored in third storage device such that each block of compressed lossy data has a corresponding artificial block of compressed lossless data, and each block of compressed lossless data has a corresponding artificial block of compressed lossy data.

5. The image data processing system of claim 4, wherein the segmenter generates a segmentation tag to identify actual compressed data blocks from artificial compressed data blocks.

6. An image data processing system, comprising:
   a memory that stores lossy compressed image data and losslessly compressed image data, the lossy compressed image data including artificial and actual lossy data and the losslessly compressed image data including artificial and actual losslessly data;
   a lossy decompressor that decompresses the lossy compressed image data stored in the memory;
   a lossless decompressor that decompresses the lossless compressed image data stored in the memory; and
   a selector that selects the actual lossy and lossless data to be output from the artificial lossy and lossless data;
   wherein the selector selects the actual lossy and lossless data to be output based on a difference in at least one value between decompressed blocks of lossy compressed image data.

7. The image data processing system of claim 6, wherein the lossy and lossless compressed image data is stored in the memory such that each block of actual lossy data has a corresponding block of artificial lossless data, and each block of actual lossless data has a corresponding artificial block of artificial lossy data.

8. The image data processing system of claim 7, wherein the selector uses segmentation tags to identify actual compressed data blocks from artificial compressed data blocks.

9. A method for processing image data, comprising:
   segmenting the image data into lossy and lossless data;
   temporarily storing the segmented lossless data in a first storage device;
   generating artificial lossless data based on a value stored in the first storage device;
   generating artificial lossy data based on a value stored in a second storage device;
   compressing the lossless data stored in the first storage device and the artificial lossless data generated in the generating step;
   compressing the lossy data segmented in the segmenting step and the artificial lossy data generated in the generating step; and
   storing the compressed lossy and lossless data in a third storage device;
   wherein the generating step generates artificial lossless data based on a value of a last pixel in each scanline in a previously compressed lossless data block.

10. The method for processing image data of claim 9, wherein the generating step generates artificial lossy data based on an average value of pixels in a previously compressed lossy data block.

11. The method for processing image data of claim 9, wherein the segmenting step segments Z×Z blocks of image data, where Z is an integer greater than 1.

12. The method for processing image data of claim 9, wherein the storing step stores lossy and lossless data such that each block of compressed lossy data has a corresponding artificial block of compressed lossless data, and each block of compressed lossless data has a corresponding artificial block of compressed lossy data.

13. The method for processing image data of claim 12, wherein the segmenting step uses segmentation tags to identify actual compressed data blocks from artificial compressed data blocks.

14. A method for processing image data, comprising:
   decompressing compressed lossy image data;
   decompressing compressed lossless image data; and
   selecting the actual lossy and lossless data to be output from artificial lossy and lossless data;
   wherein the selecting step selects the actual lossy and lossless data to be output based on a difference in at least one value between decompressed blocks of lossy compressed image data.

15. The method for processing image data of claim 14, wherein the selecting step selects the actual data to be output based on segmentation tags to used to identify actual compressed data blocks from artificial compressed data blocks.

16. A method for processing image data, comprising:
   segmenting the image data into lossy and lossless data;
   temporarily storing the segmented lossless data in a first storage device;
   generating artificial lossless data based on a value stored in the first storage device;
   generating artificial lossy data based on a value stored in a second storage device;
   compressing the lossless data stored in the first storage device and the artificial lossless data generated in the generating step;

compressing the lossy data segmented in the segmenting step and the artificial lossy data generated in the generating step; and storing the compressed lossy and lossless data in a third storage device;

decompressing the compressed lossy data;

decompressing the compressed lossless data; and selecting the actual lossy and lossless data to be output from the artificial lossy and lossless data;

wherein the selecting step selects the actual lossy and lossless data to be output based on a difference in at least one value between decompressed blocks of lossy compressed image data.

17. An image data processing system, comprising:

a segmenter that receives image data and segments the image data into lossy and lossless data;

a first storage device that temporarily stores the segmented lossless data;

an artificial lossless data generator that generates artificial lossless data based on a value stored in the first storage device;

an artificial lossy data generator that generates artificial lossy data based on a value stored in a second storage device;

a lossless compressor that compresses the lossless data stored in the first storage device and the artificial lossless data generated by the artificial data generator;

a lossy compressor that compresses the lossy data segmented by the segmenter and the artificial lossy data generated by the artificial lossy data generator; and a third storage device that stores the compressed lossy and lossless data, wherein the artificial lossy data generator generates artificial lossy data based on an average value of pixels in a previously compressed lossy data block.

18. The image data processing system of claim 17, wherein the segmenter segments Z×Z blocks of image data, where Z is an integer greater than 1.

19. The image data processing system of claim 17, wherein the lossy and lossless data is stored in third storage device such that each block of compressed lossy data has a corresponding artificial block of compressed lossless data, and each block of compressed lossless data has a corresponding artificial block of compressed lossy data.

20. The image data processing system of claim 19, wherein the segmenter generates a segmentation tag to identify actual compressed data blocks from artificial compressed data blocks.

21. A method for processing image data, comprising:

segmenting the image data into lossy and lossless data;

temporarily storing the segmented lossless data in a first storage device;

generating artificial lossless data based on a value stored in the first storage device;

generating artificial lossy data based on a value stored in a second storage device;

compressing the lossless data stored in the first storage device and the artificial lossless data generated in the generating step;

compressing the lossy data segmented in the segmenting step and the artificial lossy data generated in the generating step; and storing the compressed lossy and lossless data in a third storage device, wherein the generating step generates artificial lossy data based on an average value of pixels in a previously compressed lossy data block.

22. The method for processing image data of claim 21, wherein the segmenting step segments Z×Z blocks of image data, where Z is an integer greater than 1.

23. The method for processing image data of claim 21, wherein the storing step stores lossy and lossless data such that each block of compressed lossy data has a corresponding artificial block of compressed lossless data, and each block of compressed lossless data has a corresponding artificial block of compressed lossy data.

24. The method for processing image data of claim 23, wherein the segmenting step uses segmentation tags to identify actual compressed data blocks from artificial compressed data blocks.

* * * * *